United States Patent [19]
Will

[11] Patent Number: 6,144,312
[45] Date of Patent: Nov. 7, 2000

[54] SYSTEM OF WIRE-BUS NET CONTROL DEVICES WITH MINIMAL REST CURRENT REQUIREMENTS

[75] Inventor: Ralf Will, Renningen, Germany

[73] Assignee: MC Micro Compact Car AG, Biel, Switzerland

[21] Appl. No.: 09/061,114

[22] Filed: Apr. 16, 1998

[30] Foreign Application Priority Data

Apr. 16, 1997 [DE] Germany .......................... 197 15 880

[51] Int. Cl.[7] .................................................. G06F 7/04
[52] U.S. Cl. .................................. 340/825.31; 307/10.1; 307/10.6; 340/426; 340/825.72; 340/825.69
[58] Field of Search .................... 340/825.31, 825.69, 340/825.72, 426; 307/10.1, 10.3, 10.6

[56] References Cited

U.S. PATENT DOCUMENTS

| | | |
|---|---|---|
| 3,864,578 | 2/1975 | Lackey . |
| 4,987,317 | 1/1991 | Pournain et al. . |
| 5,408,471 | 4/1995 | Nobutoki et al. . |
| 5,534,848 | 7/1996 | Steele et al. . |
| 5,805,056 | 9/1998 | Mueller et al. .......................... 340/426 |
| 5,818,329 | 10/1998 | Allen ...................................... 340/426 |

FOREIGN PATENT DOCUMENTS

| | | |
|---|---|---|
| 0 279 168 A2 | 8/1988 | European Pat. Off. . |
| 0 392 411 A2 | 10/1990 | European Pat. Off. . |
| 0 444 997 A1 | 9/1991 | European Pat. Off. . |
| 44 27 254 A1 | 2/1996 | Germany . |
| 7-38566 | 2/1995 | Japan . |

OTHER PUBLICATIONS

Dr.–Ing. Wolfhard Lawrenz, "CAN–An Auto Bus" in FZ messen und Pruefen, Jun. 1992, pp. 46–53.
J.W. Davis, V.S. Moore, "Dynamic Power Selection Technique for High Performance Bipolar Microprocessors", IBM Technical Disclosure Bulletin, vol. 25, No. 7B, Dec. 1982, pp. 3941–3943.

*Primary Examiner*—Michael Horabik
*Assistant Examiner*—Anthony A. Asongwed
*Attorney, Agent, or Firm*—Evenson, McKeown, Edwards & Lenahan, P.L.L.C.

[57] ABSTRACT

In a system of wire-bus linked control devices with a reduced bias current requirement, all of the control devices are permanently connected to two bus bars for operational power supply, and the bus bars in turn are connected permanently with the supply poles of an operating current source. One of the control devices is equipped with a standby operating function with prompting readiness, and is continuously active in prompting readiness. Apart from its communications connection with the bus the latter control device has at least one separate signal input through which it can be prompted as well as a control output which, when the normal operating state of this control device is reached (from prompting readiness), can deliver a connect signal. Each of the other control devices has internal control means for controlling its power supply from the two bus bars and a connect control input to which a control signal for activating the internal means can be supplied. The control input of each of these control devices is connected with the control output so that when the connect signal is output, the other control devices can be energized, thus placing them in operating readiness.

9 Claims, 1 Drawing Sheet

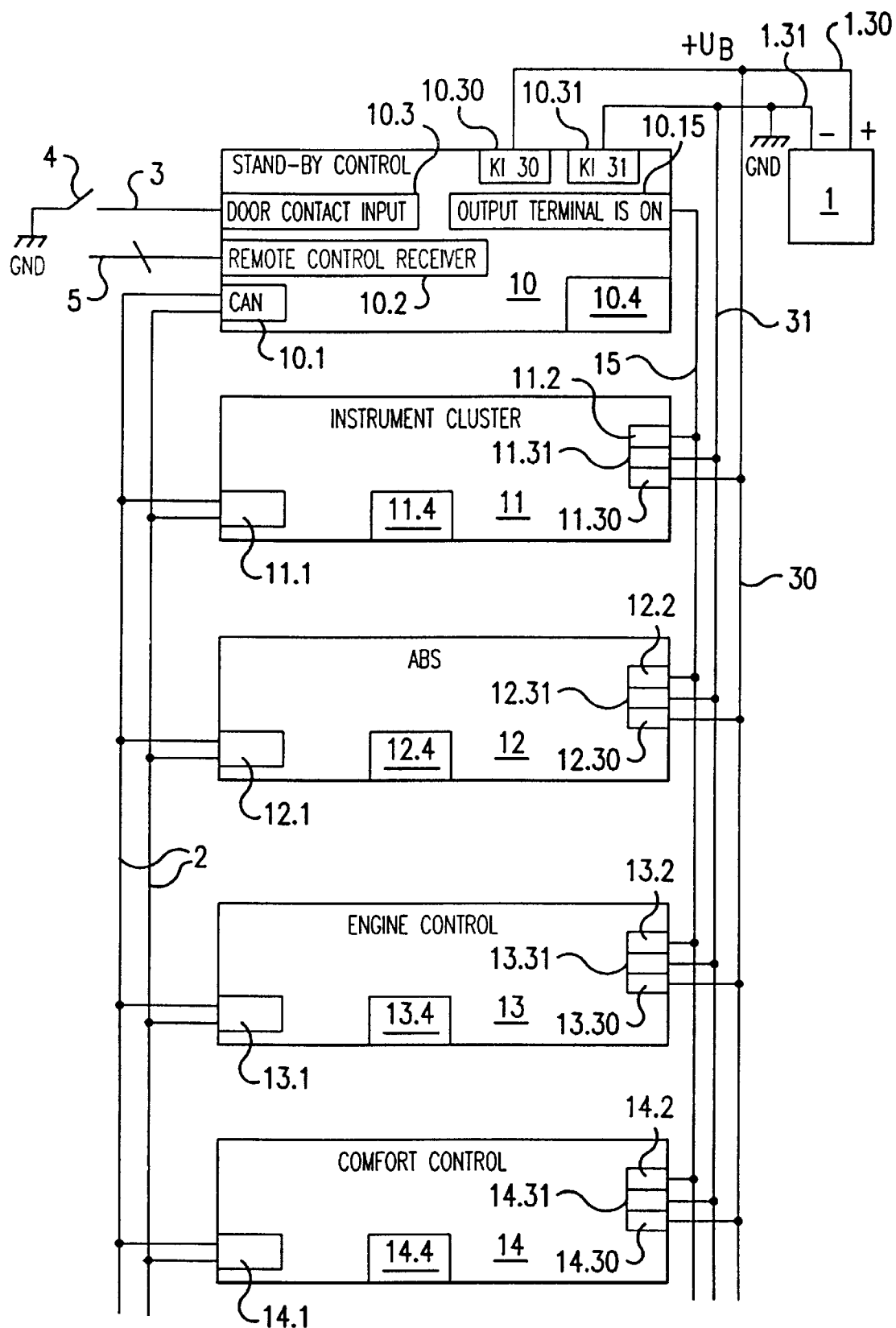

SYSTEM OF WIRE-BUS NET CONTROL DEVICES WITH MINIMAL REST CURRENT REQUIREMENTS

BACKGROUND AND SUMMARY OF THE INVENTION

This application claims the priority of German Patent Application No. 197 15 880.3-53, filed Apr. 16, 1997, the disclosure of which is expressly incorporated by reference herein.

The invention relates to a system composed of wire-bus linked control devices having a reduced system bias current requirement.

Many technical products and systems are being revolutionized by the use of bus systems. One example is the CAN bus in a vehicle or other transport means, such as in "CAN-An Auto Bus" in FZ Messen und Prüfen, June 1992, pp. 46–53, in which a plurality of electronic control devices are connected together by a two-wire data bus. The functional transfer on the data bus that is thus made possible saves on wiring costs and permits a simple and readily expandable system architecture.

Such linked systems composed of wire-bus linked control devices have the functional disadvantage that the data bus as a rule is activated only by activating a central current flow gate, such as the "ignition switch" in a vehicle for example. This means first of all that either control devices must be supplied with input signals in conventional fashion, despite the presence of a data bus in order to be able to operate with the corresponding functions when the system is shut down, for example when "Terminal 15" is not energized in a motor vehicle, which in turn results in a disadvantageous requirement for many conventional leads. (One example of this is the prompting of a group of instruments in the dashboard by a door contact in order to present display information on the instruments.) On the other hand, while the transmission of the hazard warning function of a vehicle over the CAN bus for example is theoretically possible, when "Terminal 15" is not energized, it is impossible to display the hazard warning system in an energized state when the instrument panel is not energized. In a motor vehicle for example this also means that control devices can provide or permit a continuous standby operating state with the CAN bus activated. However, this results in a high bias current requirement for the entire system, which adversely affects the energy balance of the electrical system.

IBM Technical Disclosure Bulletin, Vol. 25, No. 7B, 12/1982 describes a computer system based on intelligent macros, whose components are distributed along a bus and which has a reduced current requirement. In this arrangement, macros are used to selectively apply required current to the specific components necessary for performing specific operations in the computer system. However, this assumes that each of the functions that can be addressed by macros performs a specific macro discrimination function that would not be possible without bias current supply.

The object of the invention is to provide a system which is composed of control devices that are linked by a wire bus, and which has a reduced total bias current requirement. In other words it is not connected to bus operation when the system is not in use.

This and other objects and advantages are achieved by the system of wire-bus linked control devices according to the invention, in which all of the control devices are connected to two bus bars for their operational power supply and the bus bars are permanently connected with the supply poles of an operating current source. One of the control devices is equipped with a standby operating function with prompting readiness and is constantly active in prompting readiness; apart from its communications link with the bus, this control device has at least one separate signal input through which it can be prompted. In addition, it has a control output which (from prompting readiness) is able to output a connect signal when its normal operating state is reached. Each of the other control devices has internal means for its controllable power supply from the two bus bars and a connect control input for receiving a control signal to activate the internal means. All of these control inputs are connected with the above-mentioned control output of the standby-capable control device, so that when the connect signal is output, the other control devices can be energized and thus placed in operational readiness.

This system configuration results in a very low bias current requirement, since only a single control device needs to be designed for a standby mode with prompting readiness. When an energy storage device is used as the operating power source, for example, a theoretical service life of at least 200 days with a 10 Ah drop in capacity is guaranteed with 1–2 mA total bias current. Since the self-discharge rate of the energy storage device (a lead storage battery for example) can be considerably greater than 50 mAh/d, self-contained or mobile systems according to the invention are possible in which the bias current consumption is of no further practical significance.

In one embodiment, the system is part of a vehicle. Such a system has the advantage that hazard warning information, for example, can be transmitted over the data bus. According to another feature of the invention, a signal produced by the actuation of a door contact can be supplied to the control device with a standby operating function at its (at least one) separate signal input so that, for example, the group of instruments in the instrument panel of a motor vehicle can be prompted via the data bus.

In another embodiment, the control device with a standby operating function has at least one separate signal input for receiving a signal produced by the reception in the vehicle of remote control information received from the outside.

According to another feature of the invention, the control device with the standby operating function can be equipped to recognize entry into the transport means. According to still another feature of the invention, one of the other control devices can integrally contain at least functions for monitoring and controlling driving authorization and be so designed that it is able to transmit information received and labeled "transport means start" to the drive components of the transport means and thus can trigger the start of its driving unit.

In another embodiment, the control device with the standby operating function can integrally combine the function of a control device for monitoring and controlling driving authorization, and is designed so that it can transmit an item of information labeled "transport medium start" to the drive components of the transport means and trigger the starting of its drive unit as a result.

According to another feature of the invention, the bus is a CAN-based type. Finally, the subject discussed in one of the other control devices is one of the following: an instrument cluster in the dashboard, an ABS control device, an engine control device, or a comfort control device.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic block diagram of a system according to the invention.

DETAILED DESCRIPTION OF THE DRAWINGS

As depicted in the FIG., the system according to the invention has five control devices 10 to 14, each of which controls a bus interface 10.1 to 14.1 (transceiver). The latter connect the control devices physically to a bus, of the CAN type for example. (In this case, a two wire bus.) Each of the control devices 10 to 14 has a first supply terminal 10.31 to 14.31 (for example for a negative ground potential GND of operating power source 1) and second supply terminals 10.30 to 14.30 (for a positive supply potential $+U_S$). All of the first supply terminals 10.31 to 14.31 are connected with a bus bar 31 which in turn is permanently connected to negative terminal 1.31 of operating current source 1. All second supply terminals 10.30 to 14.30 are connected with a bus bar 30 which in turn is permanently connected to positive terminal 1.30 of operating power source 1.

Bus bar 31 for example is coupled to the electrically highly conducting body of the motor vehicle (vehicle ground GND) or formed by "Terminal 31," which bus bar 30 is connected, for example, to the positive battery current distributor in the motor vehicle or formed by "Terminal 30."

Control device 10 has a standby function which continuously receives through its supply terminals 10.30 and 10.31 a weak bias current from operating power source 1, in order to generate its prompting readiness therefrom. A prompt input 10.3 for "door contact" is shown which can be subjected to ground potential, for example, through an input line 3 from a door contact 4 connected to ground GND. In addition, an input 10.2, multiple for example, and labeled "receiver remote control" is indicated at which a received signal can be supplied for example to a remote control receiver that operates on an infrared or microwave basis. Control device 10 also has a connect control output 10.15 that is able to transmit a logical connect signal (corresponding for example to the potential "Terminal 15 on" that prevails at "Terminal 15" of a motor vehicle) to connect control lead 15.

Control device 10 with standby operating function can be equipped for example to detect entry into the vehicle. This control device can equally well monitor and control driving authorization in an integral manner, and can be so designed that it can transmit "vehicle start" information it receives to the drive components of the motor vehicle and as a result trigger the starting of its drive unit.

The other control devices 11 to 14 each have a connect control input 11.2 to 14.2, all of which are connected with connect control lead 15. In addition, each of these control devices incorporates internal control means 10.4 to 14.4 which are connected to receive connect signals via the corresponding connect control inputs 11.2 to 11.4. When triggered, the connect control inputs 11.2 to 14.2 cause the internal control means to close the internal operating circuits of control devices 11 to 14.

For example, control device 11 can be a group of instruments which collectively form a single instrument cluster in the dashboard; control device 12 can control an anti-lock braking system (ABS); control device 13 can be an engine control; and control device 14 can be a comfort control with a variety of functions. As indicated, the system can comprise additional control devices. Similarly, one of these control devices 11 to 14 or a similar one can integrally combine functions for monitoring and controlling driving authorization, and can be so designed to transmit information it receives, labeled "vehicle start," to the drive components of the motor vehicle and thereby trigger the starting of its drive unit.

The System Functions as Follows

When not operating as a whole, the system remains in a standby mode in which only the control device 10 receives a low bias current, the other control devices 11 to 14 being shut off. This is effected by a corresponding logical signal at their inputs 11.2 to 14.2 that is sent out by the connect control output 10.15 of standby control device 10. As soon as control device 10 receives a prompt signal at at least one of its inputs 10.2 or 10.3, it delivers a connect signal at its connect control output 10.15 to the inputs 11.2 to 14.2 of the other control devices, causing them to be switched on, and to draw operating current. In this manner, data or information can be exchanged immediately over bus 2 without the bus being kept operable while the system is in the resting state, and without significant current consumption of the entire system.

The invention is not limited to a system in a motor vehicle or transport unit. Instead, the invention can also be utilized with a corresponding advantageous effect in systems for other applications. In addition, the bus 2 can equally well be a bus that differs from the CAN type, for example a single wire bus using ground GND.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system comprising:
   an operating power source;
   a power supply bus which is permanently connected to supply poles of the operating power source; and
   a plurality of control devices for controlling operation of respective operating components, said plurality of control devices including a first control device and other control devices, and said plurality of control devices being permanently connected to the power supply bus for receiving a supply of operating current and being coupled in communication via a data bus; wherein
   said first control device has a standby operating function with prompting readiness, is constantly active during prompting readiness, and apart from its communication connection via the data bus, has at least one signal input through which it can be prompted as well as a switch-on control output which can deliver a switch-on signal when a normal operating state of said first control device is reached;
   each other control device has internal control means for selectively placing said other control device in a shut off state, wherein no power is consumed from the power supply bus, when said first control device is in the standby mode, and a switch-on control input to which a control signal for activating said internal control means can be supplied;
   the switch-on control input of each of the other control devices is connected with the switch-on control output of the first control device; and
   when the switch-on signal is output, the internal control means causes other control devices to be energized, and thus be placed in operational readiness.

2. System according to claim 1, wherein the system is part of a vehicle.

3. System according to claim 2, wherein a signal indicating actuation of a door contact can be supplied to the first control device at its at least one signal input.

4. System according to claim 2, wherein a signal based on reception in the vehicle of remote control information received by a transmission from outside can be supplied to the first control device at its at least one signal input.

5. System according to claim 2, wherein the first control device includes means that enable it to recognize access to the transport means.

6. System according to claim 2, wherein one of the other control devices comprises at least one of the functions for monitoring and controlling driving authorization, and is designed so that it can transmit vehicle start information to drive components of the vehicle, and thereby can trigger starting of a vehicle drive unit.

7. System according to claim 2 wherein the first control device integrally incorporates the function of a control device for monitoring and controlling driving authorization and is designed so that it can transmit received vehicle start information to drive components of the vehicle and thus trigger starting of a vehicle drive unit.

8. System according to claim 2 wherein one of the control devices is an instrument cluster in the dashboard, an ABS control device, an engine control device, or a comfort control device.

9. System according to claim 1 wherein the data bus is of the CAN type.

* * * * *